United States Patent
Honda et al.

(10) Patent No.: US 12,263,662 B2
(45) Date of Patent: Apr. 1, 2025

(54) METHOD FOR PRODUCING LAMINATE OF TWO-DIMENSIONAL MATERIAL AND LAMINATE

(71) Applicants: NITTO DENKO CORPORATION, Ibaraki (JP); KYUSHU UNIVERSITY, NATIONAL UNIVERSITY CORPORATION, Fukuoka (JP)

(72) Inventors: Satoshi Honda, Ibaraki (JP); Naofumi Kosaka, Ibaraki (JP); Shotaro Masuda, Ibaraki (JP); Atsushi Yasui, Ibaraki (JP); Hiroki Ago, Fukuoka (JP); Kenji Kawahara, Fukuoka (JP); Shun Oyama, Fukuoka (JP)

(73) Assignees: NITTO DENKO CORPORATION, Ibaraki (JP); KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 750 days.

(21) Appl. No.: 17/432,345

(22) PCT Filed: Feb. 14, 2020

(86) PCT No.: PCT/JP2020/005841
§ 371 (c)(1),
(2) Date: Aug. 19, 2021

(87) PCT Pub. No.: WO2020/170977
PCT Pub. Date: Aug. 27, 2020

(65) Prior Publication Data
US 2022/0169002 A1 Jun. 2, 2022

(30) Foreign Application Priority Data
Feb. 19, 2019 (JP) ................... 2019-027773

(51) Int. Cl.
*B32B 37/12* (2006.01)
*B32B 7/12* (2006.01)

(52) U.S. Cl.
CPC ............ *B32B 37/12* (2013.01); *B32B 7/12* (2013.01); *B32B 2037/1253* (2013.01)

(58) Field of Classification Search
CPC ........ B32B 2037/1253; B32B 2250/02; B32B 2250/03; B32B 2250/04; B32B 2307/54;
(Continued)

(56) References Cited

U.S. PATENT DOCUMENTS

2010/0028588 A1* 2/2010 Kiuchi .................. C09J 7/29
156/247
2010/0248452 A1 9/2010 Saito et al.
(Continued)

FOREIGN PATENT DOCUMENTS

CN 101031625 A 9/2007
CN 101522846 A 9/2009
(Continued)

OTHER PUBLICATIONS

Office Action issued on Mar. 18, 2023 for corresponding Chinese Patent Application No. 202080015162.6, along with an English translation (16 pages).
(Continued)

*Primary Examiner* — Sonya M Sengupta
(74) *Attorney, Agent, or Firm* — Hauptman Ham, LLP

(57) ABSTRACT

The present invention relates to a laminate including a two-dimensional material and an adhesive sheet having a base material and an adhesive layer whose adhesive force decreases due to ultraviolet rays or heat, in which an adhesive force A at 25° C. of the adhesive layer before the ultraviolet rays or heat applies, to a silicon wafer is 1.0 N/20 mm to 20.0 N/20 mm when the adhesive layer is subjected
(Continued)

to 180° peeling at a tensile speed of 300 mm/min, and a surface roughness of an adhesive surface of the adhesive layer after the ultraviolet rays or heat has been applied is 0.01 μm to 8.00 μm.

16 Claims, 4 Drawing Sheets

(58) Field of Classification Search
CPC .......... B32B 2307/748; B32B 2405/00; B32B 37/025; B32B 37/12; B32B 7/022; B32B 7/023; B32B 7/027; B32B 7/06; B32B 7/12; B32B 9/007; B32B 9/04; B32B 37/16; B32B 37/26; B32B 7/025; C09J 201/00; C09J 2203/326; C09J 2301/416; C09J 2301/502; C09J 2433/00; C09J 2475/00; C09J 5/00; C09J 7/38
See application file for complete search history.

(56) References Cited

U.S. PATENT DOCUMENTS

| | | |
|---|---|---|
| 2011/0104874 A1 | 5/2011 | Maeda et al. |
| 2012/0302041 A1 | 11/2012 | Maeda et al. |
| 2014/0183160 A1 | 7/2014 | Chiba et al. |
| 2014/0196841 A1 | 7/2014 | Chiba et al. |
| 2016/0240692 A1 | 8/2016 | Shepard et al. |
| 2016/0254559 A1 | 9/2016 | Nakano et al. |
| 2016/0285120 A1 | 9/2016 | Nakano et al. |
| 2018/0373140 A1 | 12/2018 | Yanase |

FOREIGN PATENT DOCUMENTS

| | | | |
|---|---|---|---|
| CN | 101842455 A | 9/2010 | |
| CN | 105612649 A | 5/2016 | |
| CN | 105637050 A | 6/2016 | |
| CN | 109116676 A | 1/2019 | |
| JP | 2008-115273 A | 5/2008 | |
| JP | 2009-242733 A | 10/2009 | |
| JP | 2014-172989 A | 9/2014 | |
| JP | 5850720 B2 | 2/2016 | |
| JP | 2019-8089 A | 1/2019 | |
| WO | 2013/186858 A1 | 12/2013 | |
| WO | WO-2020170977 A1 * | 8/2020 | ........... B32B 37/025 |

OTHER PUBLICATIONS

Taiwanese Office Action issued on Jan. 24, 2024, in connection with the Taiwanese Patent Application No. 109105124 with its English translation, 5 pages.
International Search Report issued for corresponding International Patent Application No. PCT/JP2020/005841 on Apr. 7, 2020, along with an English translation.
Written Opinion issued for corresponding International Patent Application No. PCT/JP2020/005841 on Apr. 7, 2020.
Japanese Office Action issued on Mar. 19, 2024 in connection with the Japanese Patent Application No. 2021-501945, with its English translation, 10 pages.
Office Action issued on Aug. 16, 2023, for corresponding Taiwanese Patent Application No. 109105124, along with an English translation (16 pages).
Office Action issued on Aug. 24, 2023, for corresponding Chinese Patent Application No. 202080015162.6, along with an English translation (11 pages).
Kai Zhang, "Polymer Physics", Jan. 1981, pp. 204-205, Chemical Industry Press, along with a partial English translation.
The Extended European Search Report issued on Oct. 10, 2022 for corresponding European Patent Application No. 20759093.6 (7 pages).

* cited by examiner

METHOD FOR PRODUCING LAMINATE OF TWO-DIMENSIONAL MATERIAL AND LAMINATE

CROSS REFERENCE TO RELATED APPLICATION

This application is a National Stage of International Application No. PCT/JP2020/005841, filed on Feb. 14, 2020, which designates the United States and was published in Japan, and which is based upon and claims priority to Japanese Patent Application No. 2019-027773, filed on Feb. 19, 2019 in the Japan Patent Office. All of the aforementioned applications are hereby incorporated by reference in their entireties.

TECHNICAL FIELD

The present invention relates to a method for producing a laminate of a two-dimensional material and a laminate.

BACKGROUND ART

A two-dimensional material such as a two-dimensional carbon material is expected to be applied in various ways, such as a wiring material and a transparent electrode, due to excellent electrical characteristics and optical characteristics thereof. Among two-dimensional carbon materials, graphene, which is a conductive planar crystal formed by $sp^2$-bonded carbon atoms, has high light transmittance and high electrical conductivity, and is expected to be used for a transparent conductive film, a transparent electrode, a transistor, and the like.

As a method for producing graphene, a chemical vapor deposition method (CVD) on a surface of a catalytic metal or the like is used. However, when graphene is used for a device, a step of transferring graphene formed on the surface of the catalytic metal to a surface of a substrate is required.

For example, Patent Literature 1 describes a method for producing graphene including a graphene forming step of forming graphene on a surface of a copper foil for graphene production, laminating a transfer sheet on the surface of the graphene, etching the copper foil for graphene production while transferring the graphene to the transfer sheet, and then transferring the graphene to another substrate and peeling off the transfer sheet.

Patent Literature 2 describes an adhesive member for temporary fixing of a fragile member, containing, as a main component, a polyurethane-based resin obtained by curing an adhesive composition containing polyol and a polyfunctional isocyanate compound, and the adhesive agent being used for temporary fixing of a fragile member such as graphene.

However, graphene is a thin film, and this causes a problem that the transfer of graphene having a large area is technically highly difficult and the deterioration of the quality occurs at the time of the transfer.

CITATION LIST

Patent Literature

Patent Literature 1: Japanese Patent No. 5850720
Patent Literature 2: JP-A-2014-172989

SUMMARY OF INVENTION

Technical Problem

A two-dimensional material such as graphene is a thin film having a thickness in the order of nanometers, and the problem is that a transfer rate at the time of transfer is decreased as an area is increased.

As described in Patent Literature 1, when the catalytic metal is removed by etching at the time that graphene is transferred from a catalytic metal to the substrate, the graphene may be broken or finely damaged, and this might lead to a decrease in yield or performance of the graphene. According to the technique described in Patent Literature 1, the catalytic metal is etched, and thus this costs the metal and requires a treatment of an etching waste liquid. Therefore, the technique has a problem in productivity.

When graphene is further transferred to another substrate after the etching, adhesion cannot be controlled by a PET film described in Patent Literature 1, and thus it is difficult to transfer graphene.

Accordingly, an object of the present invention is to provide a laminate and a method for producing a laminate of two-dimensional material that have excellent productivity and can transfer a two-dimensional material at a high transfer rate.

Solution to Problem

As a result of intensive studies to achieve the above object, the present inventors have found that the above problems in the related art can be solved by using a laminate in which a two-dimensional material and a specific adhesive layer are laminated, and have completed the present invention. That is, the present invention is as follows.

[1] A method for producing a laminate of a two-dimensional material, comprising:
  allowing a two-dimensional material on a first substrate to bond and transfer to a surface of an adhesive layer side of an adhesive sheet comprising a base material and an adhesive layer whose adhesive force decreases due to ultraviolet rays or heat, to obtain a laminate of the adhesive sheet and the two-dimensional material;
  placing the laminate on a second substrate such that a surface of the laminate on a side of the two-dimensional material is in contact with the second substrate;
  applying the ultraviolet rays or heat to the laminate; and
  transferring the two-dimensional material onto the second substrate by debonding the adhesive sheet, wherein
  an adhesive force A at 25° C. of the adhesive layer before the ultraviolet rays or heat applies, to a silicon wafer is 1.0 N/20 mm to 20.0 N/20 mm when the adhesive layer is subjected to 180° peeling at a tensile speed of 300 mm/min, and
  a surface roughness of an adhesive surface of the adhesive layer after the ultraviolet rays or heat applied is 0.01 μm to 8.00 μm.

[2] The method for producing a laminate of a two-dimensional material according to [1], wherein the two-dimensional material is a two-dimensional carbon material, molybdenum disulfide, tungsten disulfide, or hexagonal boron nitride.

[3] The method for producing a laminate of a two-dimensional material according to [1] or [2], wherein an adhesive force B at 25° C. of the adhesive layer after the ultraviolet rays or heat applied has been applied, to a silicon wafer is 0.01 N/20 mm to 1.00 N/20 mm when the adhesive layer is subjected to 180° peeling at a tensile speed of 300 mm/min.

[4] The method for producing a laminate of a two-dimensional material according to [2], wherein the two-dimensional carbon material is graphene or a graphene derivative.

[5] The method for producing a laminate of a two-dimensional material according to any one of [2] to [4], wherein the adhesive layer contains an ultraviolet curable adhesive.

[6] The method for producing a laminate of a two-dimensional material according to any one of [2] to [5], wherein the base material has ultraviolet transparency.

[7] The method for producing a laminate of a two-dimensional material according to [6], wherein a transfer rate of the two-dimensional material is 30% or more.

[8] A laminate comprising:
   a two-dimensional material; and
   an adhesive sheet having a base material and an adhesive layer whose adhesive force decreases due to ultraviolet rays or heat, wherein
   an adhesive force A at 25° C. of the adhesive layer before the ultraviolet rays or heat applies, to a silicon wafer is 1.0 N/20 mm to 20.0 N/20 mm when the adhesive layer is subjected to 180° peeling at a tensile speed of 300 mm/min, and
   a surface roughness of an adhesive surface of the adhesive layer after the ultraviolet rays or heat has been applied is 0.01 µm to 8.00 µm.

[9] The laminate according to [8], wherein the two-dimensional material is a two-dimensional carbon material, molybdenum disulfide, tungsten disulfide, or hexagonal boron nitride.

[10] The laminate according to [9], wherein an adhesive force B at 25° C. of the adhesive layer after the ultraviolet rays or heat has been applied, to a silicon wafer is 0.01 N/20 mm to 1.00 N/20 mm when the adhesive layer is subjected to 180° peeling at a tensile speed of 300 mm/min.

[11] The laminate according to [9], wherein the two-dimensional carbon material is graphene or a graphene derivative.

[12] The laminate according to any one of [9] to [11], wherein the adhesive layer contains an ultraviolet curable adhesive.

[13] The laminate according to any one of [9] to [12], wherein the base material has ultraviolet transparency.

Advantageous Effects of Invention

The present invention allows for providing a laminate and a method for producing a laminate of a two-dimensional material using the laminate that have excellent productivity and can transfer a two-dimensional material at a high transfer rate.

DESCRIPTION OF EMBODIMENTS

Hereinafter, an embodiment of the present invention will be described in detail.

A method for producing a laminate of a two-dimensional material according to the embodiment of the present invention includes:
   allowing a two-dimensional material on a first substrate to bond and transfer to a surface of an adhesive layer side of an adhesive sheet comprising a base material and an adhesive layer whose adhesive force decreases due to ultraviolet rays or heat, to obtain a laminate of the adhesive sheet and the two-dimensional material;
   placing the laminate on a second substrate such that a surface of the laminate on a side of the two-dimensional material is in contact with the second substrate;
   applying the ultraviolet rays or heat to the laminate; and
   transferring the two-dimensional material onto the second substrate by debonding the adhesive sheet, in which
   an adhesive force A at 25° C. of the adhesive layer before the ultraviolet rays or heat applies, to a silicon wafer is 1.0 N/20 mm to 20.0 N/20 mm when the adhesive layer is subjected to 180° peeling at a tensile speed of 300 mm/min, and
   a surface roughness of an adhesive surface of the adhesive layer after the ultraviolet rays or heat applied is 0.01 µm to 8.00 µm.

Hereinafter, an embodiment of the present invention will be described with reference to the drawings.

Figure 1:
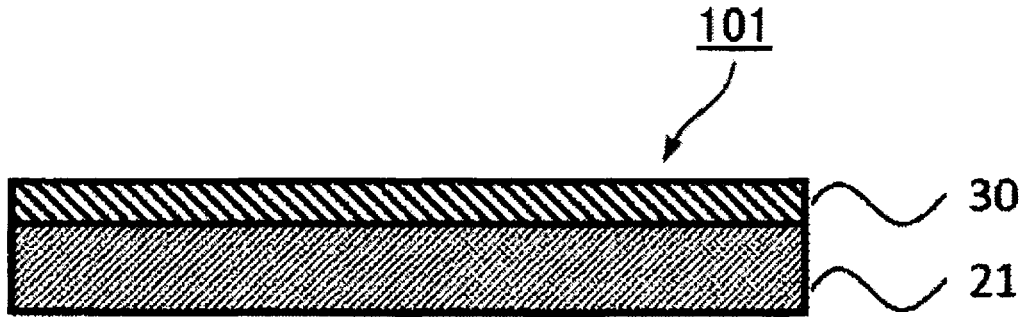
FIG. 1 is a schematic view for illustrating the production method according to an embodiment of the present invention.

FIG. 1 is a schematic view for showing a laminate 101 having a two-dimensional material 30 on a first substrate 21.

The first substrate 21 is not limited, but may be any of a metal substrate, a ceramic substrate, a silicon substrate, a resin substrate, and the like.

Examples of the first substrate 21 include a metal substrate composed of a single transition metal such as copper, nickel, cobalt, iron, chromium, gold, platinum, molybdenum, and tungsten; a metal alloy substrate of these metals; a single crystal substrate such as sapphire, magnesia, spinel, mica, SiC, SiN, Si, and a substrate obtained by oxidizing a surface of the single crystal substrate; a quartz substrate; a substrate for film formation of a two-dimensional material in which a thin film of the transition metal described above is formed on a surface of each substrate; and a substrate in which a two-dimensional material is formed on each substrate described above. The first substrate 21 is preferably a substrate for film formation of a two-dimensional material.

A method for forming a two-dimensional material on a metal substrate for film formation is not limited, but a CVD method is preferably used. Examples of the method for film formation include a thermal CVD in which a raw material gas is introduced in the presence of a catalytic metal and the raw material gas is processed by thermal decomposition, and a surface-wave microwave plasma chemical vapor deposition (CVD) in which processing by microwave plasma is performed, but it is sufficient that the two-dimensional material 30 can be formed on the first substrate 21.

The two-dimensional material 30 is a material having a two-dimensional layered structure consisting of a single kind or two or more kinds of elements, and having an extremely thin sheet structure. Graphene, which is a two-dimensional sheet composed of carbon only, is a typical example thereof. The two-dimensional material 30 may be a ribbon-shaped film having a width at the nanoscale.

Examples of the two-dimensional material include a two-dimensional carbon material, transition metal chalcogenide, molybdenum disulfide, tungsten disulfide, hexagonal boron nitride (h-BN), black phosphorus and derivatives thereof, and a two-dimensional carbon material, molybdenum disulfide, tungsten disulfide, or hexagonal boron nitride is preferable.

The two-dimensional carbon material is preferably graphene or a graphene derivative.

Graphene is a film formed of $sp^2$-bonded carbon atoms having a thickness of one atom, and forms a hexagonal lattice structure formed of carbon atoms and bonds thereof. In the present specification, multi-layer graphene in which 2 to 100 layers of these films are laminated is also referred to as "graphene".

Examples of the graphene derivative include graphene oxide, sulfonated graphene oxide, graphene hydroxide, graphene carbonate and graphene nitride, and graphene oxide is preferable.

The laminate 101 may be subjected to a treatment of immersing in water as a pretreatment. For example, in the case where the two-dimensional material is graphene, when a catalyst for forming a graphene film of the laminate 101 is Cu, the laminate 101 is immersed in water at 4° C. to 100° C. for 4 hours to 72 hours. This treatment causes water to intercalate into an interface between graphene and Cu to oxidize a Cu surface. During the immersion, water may be allowed to stand or stirred. Stirring water causes the Cu surface to be more easily oxidized. Examples of the method for the oxidization of the Cu surface include a method in which a metal salt such as potassium chloride or sodium chloride is added to water to promote oxidation of Cu and a method in which Cu is oxidized by being brought into contact with water vapor, and in any of these methods, water is intercalated into the interface between graphene and Cu, and the Cu surface is oxidized.

This oxidation allows the interaction between graphene and Cu to be weakened and allows for effectively performing the transfer to an adhesive sheet 10.

Figure 2:
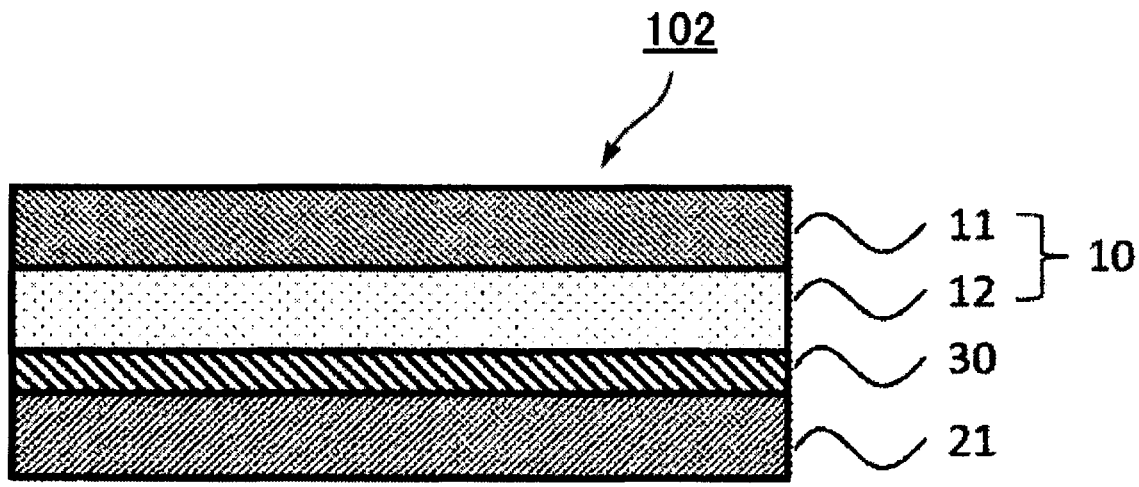
FIG. 2 is a schematic view for illustrating the production method according to an embodiment of the present invention.
Figure 3:
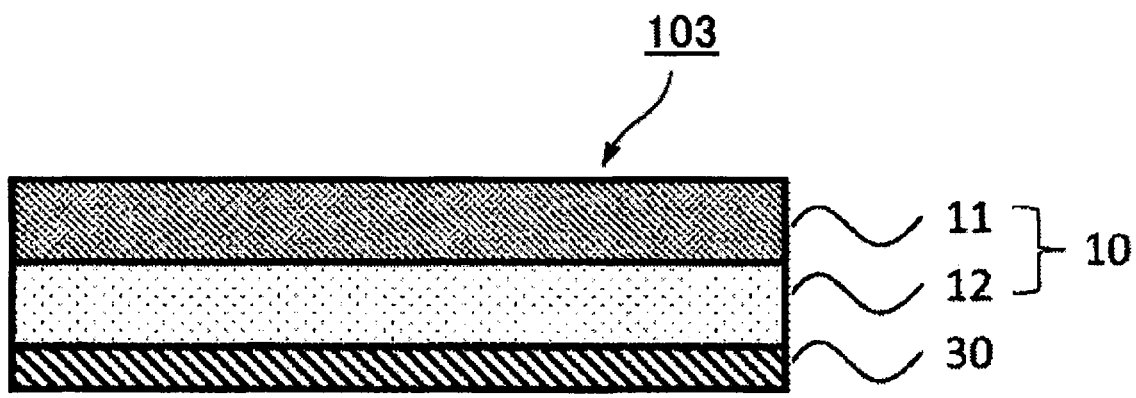
FIG. 3 is a schematic cross-sectional view illustrating a laminate according to an embodiment of the present invention.

FIGS. 2 and 3 are schematic views illustrating a step of allowing the two-dimensional material 30 on the first substrate 21 bond and transfer to a surface of an adhesive layer side of the adhesive sheet 10 having a base material 11 and an adhesive layer 12 whose adhesive force decreases due to ultraviolet rays or heat, to obtain a laminate 103 of the adhesive sheet 10 and the two-dimensional material 30.

When the adhesive sheet 10 is allowed to bond to the laminate 101 of the first substrate 21 and the two-dimensional material 30, the adhesive sheet 10 can be placed on the laminate 101 to form a laminate 102.

In the laminate 102, for example, the two-dimensional material 30 and the adhesive sheet 10 may be allowed to press-bond to each other using a roller or the like.

The two-dimensional material 30 adheres to the adhesive sheet 10, and thus the two-dimensional material 30 is transferred from the first substrate 21 to the adhesive sheet 10 by debonding the laminate 103 of the adhesive sheet 10 and the two-dimensional material 30 from the laminate 102. Alternatively, the laminate 103 in which the two-dimensional material 30 is transferred to the adhesive sheet 10 can be obtained by immersing the laminate 102 in an aqueous potassium hydroxide solution, an aqueous hydrochloric acid solution, or the like to etch a surface of the first substrate 21 facing the two-dimensional material.

The laminate 103 obtained by the present embodiment allows for, for example, transferring the two-dimensional material formed on the catalytic metal onto another substrate at a high transfer rate.

Figure 4:
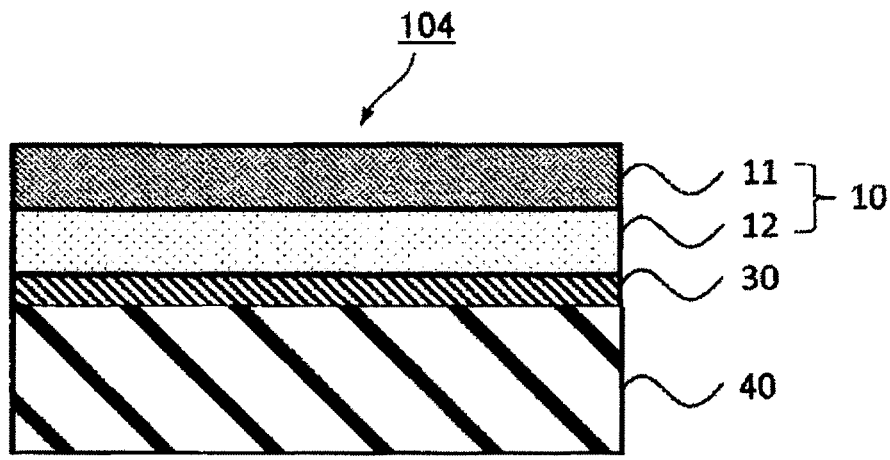
FIG. 4 is a schematic view for illustrating the production method according to an embodiment of the present invention.

FIG. 4 is a schematic view illustrating a step of placing the laminate 103 on a second substrate 40 such that a surface of the laminate 103 on a side of the two-dimensional material is in contact with the second substrate 40. A laminate 104 is obtained in which the second substrate 40 and the laminate 103 are laminated. By applying ultraviolet rays or heat to the laminate 103 (laminate 104), the adhesive force of the adhesive layer 12 decreases, and the adhesive sheet 10 is easily debonded.

A step of applying the ultraviolet rays or heat to the laminate 103 may be performed before or after a step of placing the laminate 103 on the second substrate 40, but is preferably performed after the step of placing the laminate 103 on the second substrate 40.

Figure 5:
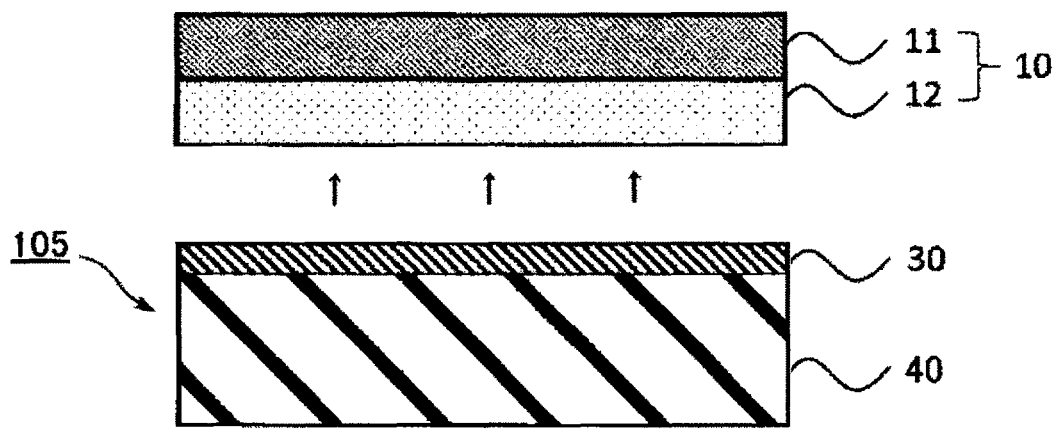
FIG. 5 is a schematic view for illustrating the production method according to an embodiment of the present invention.

FIG. 5 is a schematic view illustrating a step of transferring the two-dimensional material 30 onto the second substrate 40 by debonding the adhesive sheet 10. By debonding the adhesive sheet 10 of the laminate 104, the two-dimensional material 30 is transferred onto the second substrate 40, and a laminate of a two-dimensional material 105 is obtained.

The adhesive sheet according to the embodiment of the present invention includes the base material and the adhesive layer whose adhesive force decreases due to ultraviolet rays or heat. When the adhesive force of the adhesive layer decreases due to ultraviolet rays or heat, the two-dimensional material can be transferred onto the second substrate at a high transfer rate.

For example, the adhesive sheet exhibits a high adhesive force when a two-dimensional material formed on a metal substrate is debonded from the metal substrate and transferred onto the adhesive layer. After the laminate of the adhesive sheet and the two-dimensional material is bonded onto another substrate, removing the adhesive sheet after the adhesive force of the adhesive layer is decreased due to ultraviolet rays or heat allows for preventing the two-dimensional material from being torn, cracked or wrinkled and allows the two-dimensional material to be transferred at a high transfer rate.

A debonding angle at which the laminate 103 is debonded from the laminate 102 is not limited, but is usually 180 degrees or less. The small debonding angle allows for preventing occurrence of a defect such as a tear or a crack in the two-dimensional material 30 due to a change in a shape of the laminate 103. Thus, the debonding angle is preferably small, preferably 90 degrees or less, and more preferably 60 degrees or less. The debonding angle is preferably 0 degree or more from the viewpoint of increasing a size of a debonding apparatus itself.

The debonding angle refers to an angle formed by the first substrate 21 and a debonded portion of the laminate 103 when the laminate 103 is debonded from the laminate 102.

A debonding speed at the time of debonding the laminate 103 from the laminate 102 is not limited, but the high debonding speed causes a time during which a shape of the laminate 103 is changed to be short, and thus this allows for preventing occurrence of a defect such as a tear or a crack in the two-dimensional material 30. Thus, the debonding speed is usually 10 mm/min or more, but the debonding speed is preferably fast, preferably 1000 mm/min or more, and more preferably 2000 mm/min or more. The debonding speed is preferably 100000 mm/min or less, and more preferably 90000 mm/min or less, from the viewpoint of stable movement of the apparatus.

The debonding speed refers to a length of a part of the laminate 103 debonded from the laminate 102 per unit time when the laminate 103 is debonded from the laminate 102.

The transfer rate of the two-dimensional material is preferably 30% or more, more preferably 50% or more, and still more preferably 70% or more.

Here, the transfer rate of the two-dimensional material can be obtained as follows.

For example, when the two-dimensional material is graphene, graphene is grown on a surface of a Cu/sapphire substrate by thermal CVD, and then Cu is oxidized. When a Cu surface of the Cu/sapphire substrate is completely covered with graphene, oxidation of Cu occurs uniformly over an entire surface of the substrate. On the other hand, when the Cu surface is not completely covered with graphene, a Cu region directly below a crystal grain group of graphene (Cu region covered with graphene) and a Cu region not covered with graphene are oxidized in different manners, so that the crystal grain group of graphene can be clearly observed.

Thereafter, an adhesive tape is attached to the graphene and debonded, and adhesive tape/graphene is attached to a silicon substrate (for example, manufactured by SUMCO) having a thickness of 0.5 mm and having an oxide film of 300 nm as a transfer-target material. An adhesive tape/graphene/silicon substrate is irradiated with ultraviolet rays or heated to reduce the adhesive force of the adhesive tape, and then the adhesive tape is debonded.

When the Cu surface is completely covered with graphene, an image of the graphene transferred to a surface of the transfer-target material after the adhesive tape is peeled off is observed with a microscope, and an area ratio of the graphene in the image expressed in percentage is defined as the transfer rate.

When the Cu surface is not completely covered with graphene, the graphene crystal grain group on the Cu/sapphire substrate before the adhesion of the adhesive tape and the graphene crystal grain group on the transfer-target material transferred by the adhesive tape are compared by microscopic observation, and an area ratio of the graphene crystal grain group on the Cu/sapphire substrate to an area of the crystal grain group transferred to the surface of the transfer-target material expressed in percentage is defined as the transfer rate.

As the base material 11, for example, a base material containing any resin selected from nylon, polyurethane, polyester, polyolefin, and an olefin-based elastomer as a main component, and a crosslinked product thereof can be used. The base material 11 preferably has ultraviolet transparency.

As the base material 11, a non-stretched film may be used, or a uniaxially or biaxially stretched film may be used as necessary.

A thickness of the base material 11 is not limited but may be appropriately selected, but is generally about 5 µm to 200 µm.

The adhesive force of the adhesive layer 12 is reduced by ultraviolet rays or heat.

As for the adhesive force A (initial adhesive force) before application of ultraviolet rays or heat, an adhesive force at 25° C. to a silicon wafer is preferably 1.0 N/20 mm or more, more preferably 1.5 N/20 mm or more and still more preferably 2.0 N/20 mm or more, and preferably 20.0 N/20 mm or less, more preferably 17.0 N/20 mm or less and still more preferably 15.0 N/20 mm or less, from the viewpoint of the transfer rate of graphene to the adhesive sheet.

As for an adhesive force B of the adhesive layer after the application of ultraviolet rays or heat, an adhesive force at 25° C. to a silicon wafer is preferably 0.01 N/20 mm or more, more preferably 0.03 N/20 mm or more and even more preferably 0.05 N/20 mm or more, and preferably 1.00 N/20 mm or less, more preferably 0.50 N/20 mm or less and even more preferably 0.25 N/20 mm or less, from the viewpoint of the transfer rate of graphene from the adhesive sheet.

Here, each of the adhesive force A and the adhesive force B is an adhesive force when 180° peeling is performed on a silicon wafer at 25° C. at a tensile speed of 300 mm/min.

The adhesive force after the application of ultraviolet rays or heat is preferably reduced to 30% or less, and more preferably reduced to 10% or less, with respect to the adhesive force before the application of ultraviolet rays or heat.

The adhesive layer can be irradiated with ultraviolet rays to promote crosslinking or polymerization of a resin contained in the adhesive layer, thereby reducing the adhesive force of the adhesive layer.

In the adhesive layer, the adhesive force of the adhesive layer is reduced by heat such as heating or cooling. For example, the crosslinking or polymerization of the resin contained in the adhesive layer can be promoted by heating to reduce the adhesive force of the adhesive layer. For example, a foaming agent may be added to the adhesive layer, and the adhesive layer may be foamed by heating to generate unevenness on a contact surface between the adhesive layer and the two-dimensional material, thereby reducing the adhesive force of the adhesive layer. Even when the contact surface of the adhesive layer is uneven, a surface roughness of the adhesive surface of the adhesive layer needs to be 0.01 µm to 8.00 µm in order to prevent a decrease in the transfer rate.

In the adhesive layer according to the embodiment of the present invention, the surface roughness of the adhesive surface of the adhesive layer after the application of ultraviolet rays or heat is 0.01 µm to 8.00 µm. The surface roughness of the adhesive surface of the adhesive layer is preferably 0.03 µm or more, more preferably 0.05 µm or more and still more preferably 0.10 µm or more, and preferably 5.00 µm or less, more preferably 4.00 µm or less and still more preferably 3.00 µm or less.

When the surface roughness of the adhesive surface of the adhesive layer after the application of ultraviolet rays or heat is greater than 8.00 µm, a film of the two-dimensional material is broken or scratched, and the transfer rate is lowered. When the surface roughness of the adhesive surface of the adhesive layer is less than 0.01 µm, it is difficult to produce the adhesive surface itself.

The surface roughness of the adhesive surface of the adhesive layer can be measured by a white light confocal microscope (Lasertec OPTELICS HYBRID, manufactured by Lasertec Corporation) using a 20×objective lens with software "LMeye 7". After the adhesive layer is attached to a silicon wafer, the adhesive outermost surface of the debonded adhesive surface of the adhesive layer in which the adhesive force has been reduced with heat or ultraviolet rays is focused on, scanned and measured in a range of up and down 50 μm. Using the same software "LMeye 7", a measured 750 μm square image is used to calculate Ra at 5 locations on any line with a surface roughness line profile, and an average value thereof is taken as the surface roughness.

The adhesive layer 12 preferably contains an ultraviolet curable adhesive. The ultraviolet curable adhesive can increase a degree of crosslinking by irradiation with ultraviolet rays to easily reduce the adhesive force thereof.

The ultraviolet curable adhesive preferably has an ultraviolet curable functional group such as a radical reactive carbon-carbon double bond and exhibits adhesiveness.

Examples of the ultraviolet curable adhesive include an addition-type ultraviolet curable adhesive in which an ultraviolet curable monomer component, an ultraviolet curable oligomer component and the like are blended in an acrylic adhesive.

Examples of the acrylic polymer include acrylic polymers in which one or two or more of (meth)acrylic acid alkyl esters (for example, linear or branched alkyl esters having 1 to 30 carbon atoms, particularly 4 to 18 carbon atoms in an alkyl group, such as methyl ester, ethyl ester, propyl ester, isopropyl ester, butyl ester, isobutyl ester, sec-butyl ester, t-butyl ester, pentyl ester, isopentyl ester, hexyl ester, heptyl ester, octyl ester, 2-ethylhexyl ester, isooctyl ester, nonyl ester, decyl ester, isodecyl ester, undecyl ester, dodecyl ester, tridecyl ester, tetradecyl ester, hexadecyl ester, octadecyl ester, and eicosyl ester) and (meth)acrylic acid cycloalkyl esters (for example, cyclopentyl ester, cyclohexyl ester) are used as monomer components. The term "(meth)acrylic acid ester" refers to an acrylic acid ester and/or a methacrylic acid ester, and the term "(meth)" in the present invention has the same meaning.

The acrylic polymer contains a hydroxyl group-containing monomer copolymerizable with the acrylic acid ester as an essential component. Examples of the hydroxyl group-containing monomer include 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl (meth)acrylate, and (4-hydroxymethylcyclohexyl)methyl (meth)acrylate.

The content of the hydroxyl group-containing monomer is preferably in a range of 10 mol % to 30 mol %, and more preferably in a range of 15 mol % to 25 mol % with respect to the acrylic acid ester. When the content is 10 mol % or more, crosslinking after ultraviolet irradiation becomes sufficient, the transfer rate of the two-dimensional material is improved, and the productivity is increased.

If necessary, the acrylic polymer may contain a unit corresponding to another monomer component copolymerizable with the acrylic acid alkyl ester or acrylic acid cycloalkyl ester. Examples of such monomer component include carboxyl group-containing monomers such as acrylic acid, methacrylic acid, carboxyethyl(meth)acrylate, carboxypentyl(meth)acrylate, itaconic acid, maleic acid, fumaric acid and crotonic acid; acid anhydride monomers such as maleic anhydride and itaconic anhydride; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl(meth)acrylate and (meth)acryloyloxynaphthalenesulfonic acid; phosphoric acid group-containing monomers such as 2-hydroxyethylacryloyl phosphate; acrylamide, and acrylonitrile. These copolymerizable monomer components may be used alone or in combination of two or more. The amount of these copolymerizable monomers to be used is preferably 40% by mass or less of the total monomer components. The amount of the carboxyl group-containing monomer to be used is preferably 0 to 3% by mass or less of the total monomer components. In addition, a hydroxyl group-containing monomer or a glycidyl group-containing monomer can also react with an epoxy group in the epoxy resin, and thus it is preferable to use the same as in the case of the carboxyl group-containing monomer.

The acrylic polymer preferably contains an isocyanate compound having a radical reactive carbon-carbon double bond. Examples of the isocyanate compound include methacryloyl isocyanate, 2-methacryloyloxyethyl isocyanate, 2-acryloyloxyethyl isocyanate, and m-isopropenyl-α,α-dimethylbenzyl isocyanate.

The content of the isocyanate compound having a radical reactive carbon-carbon double bond is preferably in a range of 50 mol % to 90 mol %, and more preferably in a range of 75 mol % to 85 mol % with respect to the hydroxyl group-containing monomer. When the content is 50 mol % or more, crosslinking after ultraviolet irradiation sufficiently proceeds, and the transfer rate of the two-dimensional material is increased, and thus this is preferable.

The acrylic polymer is obtained by subjecting a single monomer or a mixture of two or more monomers to polymerization. The polymerization may be performed by any method such as solution polymerization, emulsion polymerization, bulk polymerization, suspension polymerization, and the like. A weight average molecular weight of the acrylic polymer is preferably about 350000 to 1000000, and more preferably about 450000 to 800000.

The adhesive layer 12 may contain a thermoplastic resin. Examples of the thermoplastic resin include natural or synthetic rubbers such as natural rubber, polyisobutylene, polyisoprene, chloroprene rubber, butyl rubber and nitrile butyl rubber; olefin-based elastomers such as ethylene-propylene copolymer, ethylene-propylene-diene copolymer, ethylene-vinyl acetate copolymer, polybutene and chlorinated polyethylene; styrene-based elastomers such as styrene-butadiene-styrene copolymer, styrene-isoprene-styrene copolymer and hydrogenated products thereof; polyester-based elastomers; polyamide-based elastomers; and various thermoplastic elastomers such as polyurethane-based elastomers. These rubber components or thermoplastic elastomer components may be used alone or in combination of two or more.

The adhesive layer 12 may contain a foaming agent in addition to the resin described above. The foaming agent may be used alone or in combination of two or more kinds thereof.

The foaming agent is not limited, but an inorganic substance is preferably used. Examples of the inorganic substance include hydroxides such as aluminum hydroxide, potassium hydroxide, calcium hydroxide and magnesium hydroxide; clay (particularly, hard clay); talc; silica; zeolite; alkaline earth metal carbonates such as calcium carbonate and magnesium carbonate; metal oxides such as zinc oxide, titanium oxide and alumina; metal powders such as various metal powders such as iron powder, copper powder, aluminum powder, nickel powder, zinc powder and titanium powder, and alloy powders; mica; carbon particles; glass fibers; carbon tubes; layered silicates; and glass.

The thickness of the adhesive layer is not limited, but is preferably 2 μm or more, more preferably 5 μm or more, and still more preferably 10 μm or more from the viewpoint of allowing the adhesive layer to exhibit good adhesiveness to the two-dimensional material, and is preferably 500 μm or less, more preferably 100 μm or less, and still more preferably 50 μm or less from the viewpoint of film formability of the smooth adhesive layer.

The second substrate 40 is a transfer-target material for a two-dimensional material. The second substrate 40 is preferably a substrate in which the adhesive force between the transfer surface of the second substrate 40 and the two-dimensional material 30 is stronger than the adhesive force between the adhesive layer 12 after the application of ultraviolet rays or heat and the two-dimensional material 30. The second substrate 40 may have a strong interaction force by itself, or may be a substrate to which an interaction force is applied by processing the surface. The processing of the surface includes methods such as application of a curable resin, melting of the surface, formation of a fine structure, and surface chemical modification, but the method is not limited thereto.

The second substrate 40 is not limited, but may be any of a metal substrate, a ceramic substrate, a silicon substrate, a resin substrate, and the like. As the second substrate 40, for example, a $SiO_2$/Si substrate, a quartz substrate, a glass substrate, a PET substrate, a sapphire substrate, an ITO substrate, or a substrate in which a two-dimensional material is laminated is preferable, and the $SiO_2$/Si substrate is more preferable.

The thickness of the second substrate 40 is not limited and may be appropriately selected, but is preferably 1 μm or more, more preferably 10 μm or more and still more preferably 100 μm or more, and preferably 100 mm or less, more preferably 20 mm or less, and still more preferably 5 mm or less from the viewpoint of handling.

The laminate of the two-dimensional material obtained by the method for producing a laminate of a two-dimensional material according to the embodiment of the present invention can be applied to a transparent conductive film for use in a touch panel or the like, a semiconductor device or an electronic device such as a transistor or an integrated circuit, a transparent electrode or an electrochemical electrode requiring a large area, and the like.

Example

Hereinafter, the present invention will be described based on Examples, but the present invention is not limited to these Examples.

<Production of Adhesive Sheet 1>

A reaction vessel equipped with a condenser pipe, a nitrogen introducing pipe, a thermometer and a stirrer was charged with 75 parts by mass of n-butyl acrylate (hereinafter, referred to as "BA"), 25 parts by mass of acryloyl morpholine (hereinafter referred to as "ACMO"), 20 parts by mass of 2-hydroxyethyl acrylate (hereinafter referred to as "HEA"), 0.2 parts by mass of benzoyl peroxide and 65 parts by mass of toluene, followed by polymerization at 61° C. for 6 hours in a nitrogen stream to obtain an acrylic polymer A.

To the acrylic polymer A, 2-methacryloyloxyethylisocyanate (hereinafter, referred to as "MOI") was added in an amount of 80 mol % relative to HEA, and the resultant was subjected to an addition reaction treatment at 50° C. for 48 hours in an air stream to obtain an acrylic polymer A'.

Next, 8 parts by mass of a polyisocyanate compound (trade name "Coronate L", manufactured by Nippon Polyurethane Industry Co., Ltd.) and 5 parts by mass of a photopolymerization initiator (trade name "Irgacure 651", manufactured by Ciba Specialty Chemicals) were added to 100 parts by mass of the acrylic polymer A' to prepare an adhesive solution.

The adhesive solution prepared as described above was applied onto a silicone-treated surface of a PET debonding liner, and the applied one was heated and crosslinked at 120° C. for 2 minutes to form an adhesive layer having a thickness of 17 μm. Next, an ethylene-vinyl acetate copolymer (EVA) film having a thickness of 115 μm was allowed to bond to the adhesive layer surface. Thereafter, the resultant was stored at 50° C. for 24 hours, and then an adhesive sheet 1 was produced.

<Production of Adhesive Sheet 2>

A reaction vessel equipped with a condenser pipe, a nitrogen introducing pipe, a thermometer, and a stirrer was charged with 30 parts by mass of 2-ethylhexyl acrylate (hereinafter, referred to as "2EHA"), 70 parts by mass of methyl acrylate (hereinafter referred to as "MA"), 10 parts by mass of acrylic acid (hereinafter referred to as "AA"), 0.2 parts by mass of benzoyl peroxide and 65 parts by mass of toluene, followed by polymerization at 61° C. for 6 hours in a nitrogen stream to obtain an acrylic polymer B.

Next, 100 parts by mass of a photopolymerizable oligomer UV-1700B (manufactured by Nippon Synthetic Chemical Industry Co., Ltd.), 1 part by mass of a melamine resin (trade name: "Super beckamine J-820-60N", manufactured by Dainippon Ink Co., Ltd.), 1 part by mass of a polyisocyanate compound (trade name: "Coronate L", manufactured by Nippon Polyurethane Industry Co., Ltd.), and 3 parts by mass of a photopolymerization initiator (trade name: "Irgacure 651", manufactured by Ciba Specialty Chemicals Co., Ltd.) were added to 100 parts by mass of the acrylic polymer B to prepare an adhesive solution.

The adhesive solution prepared as described above was applied onto a silicone-treated surface of a PET debonding liner, and the applied one was heated and crosslinked at 120° C. for 2 minutes to form an adhesive layer having a thickness of 20 μm. Next, a polyolefin film having a thickness of 150 μm was allowed to bond to the adhesive layer surface. Thereafter, the resultant was stored at 50° C. for 24 hours, and then an adhesive sheet 2 was produced.

<Production of Adhesive Sheet 3>

A reaction vessel equipped with a condenser pipe, a nitrogen introducing pipe, a thermometer and a stirrer was charged with 50 parts by mass of BA, 50 parts by mass of ethyl acrylate (hereinafter, referred to as "EA"), 10 parts by mass of HEA, 0.2 parts by mass of benzoyl peroxide, and 65 parts by mass of toluene, followed by polymerization at 61° C. for 6 hours in a nitrogen stream to obtain an acrylic polymer C.

MOI was added to the acrylic polymer C in an amount of 50 mol % relative to HEA, and the resultant was subjected to an addition reaction treatment in an air stream at 50° C. for 48 hours to obtain an acrylic polymer C'.

Next, 8 parts by mass of a polyisocyanate compound (trade name "Coronate L", manufactured by Nippon Polyurethane Industry Co., Ltd.) and 5 parts by mass of a photopolymerization initiator (trade name "Irgacure 651", manufactured by Ciba Specialty Chemicals) were added to 100 parts by mass of the acrylic polymer C' to prepare an adhesive solution.

The adhesive solution prepared as described above was applied onto a silicone-treated surface of a PET debonding liner, and the applied one was heated and crosslinked at 120° C. for 2 minutes to form an adhesive layer having a thickness of 30 μm. Next, a PET film having a thickness of 50 μm was bonded to the adhesive layer surface. Thereafter, the resultant was stored at 50° C. for 24 hours, and then an adhesive sheet 3 was produced.

<Production of Adhesive Sheet 4>

A reaction vessel equipped with a condenser pipe, a nitrogen introducing pipe, a thermometer and a stirrer was charged with 20 parts by mass of EA, 80 parts by mass of BA, 10 parts by mass of AA, 0.2 parts by mass of benzoyl peroxide, and 65 parts by mass of toluene, followed by polymerization at 61° C. for 6 hours in a nitrogen stream to obtain an acrylic polymer D.

100 parts by mass of the acrylic polymer D, 1 part by mass of an epoxy-based crosslinking agent (trade name "Tetrad-C", manufactured by Mitsubishi Gas Chemical Company, Inc.), 5 parts by mass of a rosin-based tackifier (trade name "Tamanol 361", manufactured by Arakawa Chemical Industries, Ltd.), 30 parts by mass of a foaming agent (thermally expandable microspheres; trade name "Matsumoto Microsphere F-501D", manufactured by Matsumoto Yushi-Seiyaku Co., Ltd.; 120° C. foaming expansion type), and toluene were uniformly mixed, a dissolved coating liquid was applied to one surface of a PET film having a thickness of 100 μm so as to have a thickness after drying of 50 μm and the applied one was dried, and the silicone-treated surface of a PET debonding liner was allowed to bond to the dried one to produce an adhesive sheet 4.

<Production of Adhesive Sheet 5>

100 parts by mass of a photopolymerizable oligomer UV-1700B (manufactured by Nippon Synthetic Chemical Industry Co., Ltd.), 1 part by mass of a melamine resin (trade name "Super beckamine J-820-60N", manufactured by Dainippon Ink Co., Ltd.), and 8 parts by mass of a polyisocyanate compound (trade name "Coronate L", manufactured by Nippon Polyurethane Industry Co., Ltd.) were added to 100 parts by mass of the acrylic polymer B to prepare an adhesive solution.

The adhesive solution prepared as described above was applied onto a silicone-treated surface of a PET debonding liner, and the applied one was heated and crosslinked at 120° C. for 2 minutes to form an adhesive layer having a thickness of 20 μm. Next, a polyolefin film having a thickness of 150 μm was allowed to bond to the adhesive layer surface of the adhesive layer. Thereafter, the resultant was stored at 50° C. for 24 hours, and then an adhesive sheet 5 was produced.

<Production of Adhesive Sheet 6>

An adhesive sheet 6 was produced in the same manner as in the production of the adhesive sheet 1 except that MOI in the production of the adhesive sheet 1 was changed to 50 mol % relative to HEA.

<Production of Adhesive Sheet 7>

An adhesive sheet 7 was prepared in the same manner as in the preparation of the adhesive sheet 1 except that ACMO in the production of the adhesive sheet 1 was changed to 30 parts by mass and MOI in the production of the adhesive sheet 1 was changed to 50 mol % relative to HEA.

<Production of Adhesive Sheet 8>

An adhesive sheet 8 was produced in the same manner as in the production of the adhesive sheet 1 except that HEA in the production of the adhesive sheet 1 was changed to 4-hydroxybutyl acrylate (hereinafter referred to as "4HBA") and MOI in the production of the adhesive sheet 1 was changed to 50 mol % relative to 4HBA.

<Production of Adhesive Sheet 9>

An adhesive sheet 9 was produced in the same manner as in the production of the adhesive sheet 1 except that the EVA film in the production of the adhesive sheet 1 was changed to a nylon film having a thickness of 25 μm.

<Production of Adhesive Sheet 10>

An adhesive sheet 10 was produced in the same manner as in the production of the adhesive sheet 1 except that the EVA film in the production of the adhesive sheet 1 was changed to a polyolefin (biaxially stretched polypropylene) film having a thickness of 50 μm.

<Production of Adhesive Sheet 11>

An adhesive sheet 11 was produced in the same manner as in the production of the adhesive sheet 1 except that the EVA film in the production of the adhesive sheet 1 was changed to a polyolefin (poly-4-methylpentene-1) film having a thickness of 50 μm.

<Formation of Epitaxial Metal Film by Sputtering on Single Crystal Substrate Surface>

As a single crystal substrate, a c-plane (0001) of sapphire ($\alpha$-$Al_2O_3$) purchased from Adamant Namiki Precision Jewel Co., Ltd. was used.

The single crystal substrate was mounted in a chamber of an RF magnetron sputtering apparatus (Shibaura Mechatronics CFS-4ES), and Cu metal was sputtered on a surface of a single crystal substrate (under an Ar atmosphere, a degree of vacuum of 0.6 Pa is a standard). Thus, a Cu film having a thickness of 1000 nm was epitaxially deposited to obtain a Cu/sapphire substrate.

<CVD Film Formation of Graphene>

The Cu/sapphire substrate was placed as a substrate for film formation of graphene in a quartz tube (inner diameter: 26 mm$\varphi$) set in a ceramic tubular furnace manufactured by Asahi Rika Factory, Ltd. A substrate having a size of 10 mm square was used. Thereafter, a temperature was raised to a predetermined temperature (1000° C. to 1075° C.) under atmospheric pressure while argon and hydrogen were allowed to flow. After the temperature reached the predetermined temperature, the Cu surface was reduced and smoothed by being held under the same conditions for 0 to 3 hours. Thereafter, 10 ppm to 200 ppm of methane was added and a chemical vapor phase reaction was performed. After the reaction, the Cu/sapphire substrate in which a single-layer graphene was formed was cooled to a room temperature (23° C.), and then the Cu/sapphire substrate was taken out from the quartz tube. By this reaction, a single-layer graphene having a crystal grain size of 10 to 200 μm was formed on the Cu surface.

A continuous film (entire surface) covering the entire surface of the Cu surface was formed by a chemical vapor phase reaction for 90 minutes, and isolated graphene crystal grains were formed by the chemical vapor phase reaction for 30 minutes. Depending on a reaction time, the isolated graphene crystal grains (grains) or a continuous film covering the entire surface of Cu could be formed. 90% or more of an area of the formed graphene was a single layer.

<Oxidation of Graphene/Cu/sapphire Substrate in Water>

3 ml of ultrapure water (Milli-Q) was put in a sample tube with a capacity of 50 ml, and a laminate 1a (two types of entire surface and grains) in which graphene was formed on the Cu/sapphire substrate in the above was immersed in the ultrapure water in a beaker. This was placed in a constant temperature bath set at 40° C. and allowed to stand for 4 hours to 72 hours to oxidize the Cu surface.

Example 1

The adhesive sheet 1 was attached to a surface of a graphene side of the laminate 1a that has been subjected to an oxidation treatment of a Cu surface with a roller (pressure of 2 kg/10 mm), and the attached one was subjected to an autoclave treatment at 5 atm at 50° C. for 30 minutes and allowed to stand at normal temperature and normal pressure for 30 minutes. Then, the resultant one was debonded at a debonding angle of 180° and a debonding speed of 300 mm/min to transfer graphene from a Cu/sapphire substrate to the adhesive sheet 1, thereby obtaining a laminate 1b.

Thereafter, the laminate 1b was placed so that a surface of a graphene side of the laminate 1b was in contact with a silicon substrate with an oxide film (silicon (crystal plane (100), manufactured by SUMCO Corporation), surface thermal oxidation-oxide film thickness: 300 nm), and the resultant one was allowed to bond with a roller (pressure of 2 kg/10 mm) to obtain a laminate 1c. The laminate 1c was allowed to stand at normal temperature and normal pressure for 30 minutes, and then subjected to a UV treatment with a UV irradiator (UM-810, manufactured by Nitto Seiki Co., Ltd.) at an irradiation dose of 450 mJ/cm$^2$ from a base material side of the adhesive sheet 1, and the adhesive sheet 1 was debonded at a debonding angle of 180° and a debonding speed of 300 mm/min to transfer graphene of the laminate 1a to the silicon substrate, thereby obtaining a laminate of the silicon substrate and the graphene in Example 1.

Example 2

A laminate of a silicon substrate and graphene in Example 2 was obtained in the same manner as in Example 1 except that the adhesive sheet 1 in Example 1 was changed to the adhesive sheet 2.

Example 3

A laminate of a silicon substrate and graphene in Example 3 was obtained in the same manner as in Example 1 except that the adhesive sheet 1 in Example 1 was changed to the adhesive sheet 3.

Examples 4 to 7

Laminates of a silicon substrate and graphene in Examples 4 to 7 were obtained in the same manner as in Example 1 except that a debonding angle at the time of transferring graphene from the Cu/sapphire substrate to the adhesive sheet was changed to an angle described in Table 3 and the debonding speed was changed to 1000 mm/min.

Graphene transferred from the Cu/sapphire substrate to the adhesive sheet was observed. Graphene obtained in Examples 4 and 5 had almost no cracks and were relatively good. In graphene obtained in Examples 6 and 7, cracks occurred in a substantially vertical direction (perpendicular direction to the debonding) to a debonding direction (direction from a start of debonding to an end of debonding). The observation results were shown in Table 3.

Examples 8 to 13

Laminates of a silicon substrate and graphene in Examples 8 to 13 were obtained in the same manner as in Example 1 except that a debonding angle at the time of transferring graphene from the Cu/sapphire substrate to the adhesive sheet was changed to 20 degrees and a debonding speed was changed to a speed shown in Table 4.

Graphene transferred from the Cu/sapphire substrate to the adhesive sheet was observed. Graphene obtained in Examples 8 and 9 had almost no cracks and were relatively good. Graphene obtained in Examples 10 to 12 had cracks as a whole and destroyed. Graphene obtained in Example 13 had no cracks and was good. The observation results were shown in Table 4.

Examples 14 to 19

Laminates of a silicon substrate and graphene in Examples 14 to 19 were obtained by performing the same operation as in Example 1 except that the adhesive sheet 1 in Example 1 was changed to adhesive sheets 6 to 11.

Example 20

(CVD Film Formation of $MoS_2$)

A sapphire substrate (manufactured by Kyocera Corporation, c-plane), as a substrate for film formation of molybdenum disulfide ($MoS_2$), which is a kind of transition metal chalcogenide, was placed in a quartz tube (inner diameter: 26 mmφ) set in a ceramic tubular furnace manufactured by Asahi Rika Factory, Ltd. A crucible containing molybdenum trioxide powder as a raw material was placed in an upstream region of a gas flow with respect to a substrate for film formation in the quartz tube, and a crucible containing sulfur powder was further placed in the upstream region.

A sapphire substrate having a size of 10 mm square was used, and 10 mg to 50 mg of molybdenum trioxide and 50 mg to 200 mg of sulfur were used. As for a distance between the sapphire substrate and each crucible, the sapphire substrate requiring the highest reaction temperature was placed at a center of the tubular furnace, the crucible for the molybdenum trioxide was placed at a position 10 cm to 20 cm away therefrom, and the crucible for the sulfur was placed at a position 15 cm to 25 cm away from the crucible for the molybdenum trioxide.

Thereafter, the sapphire substrate and each crucible were heated to a predetermined temperature (substrate: 850° C. to 950° C., molybdenum trioxide: 580° C. to 600° C., sulfur: 100° C. to 200° C.) under atmospheric pressure while argon was allowed to flow, and a chemical vapor phase reaction for 30 minutes was performed. After the reaction, the sapphire substrate on which isolated $MoS_2$ crystal grains were formed was cooled and the temperature of the substrate reached at room temperature (23° C.), and then the sapphire substrate was taken out from the quartz tube. By this reaction, $MoS_2$ having a crystal grain size of about 5 μm to 50 μm was formed on a surface of the sapphire substrate (laminate 20a (grains)).

(Method of Debonding and Transferring $MoS_2$ Grown on Sapphire Substrate from Sapphire Substrate)

The adhesive sheet 1 was attached to a surface of a $MoS_2$ side of the laminate 20a (grains) with a roller (pressure of 2 kg/10 mm), and the attached one was subjected to an autoclave treatment at 5 atm at 50° C. for 30 minutes and allowed to stand at normal temperature and normal pressure for 30 minutes.

Thereafter, a laminate 20b (adhesive sheet/$MoS_2$/sapphire substrate) was immersed in an aqueous potassium hydroxide solution having a concentration of 1 mol/L. Thus, only the outermost surface of the sapphire substrate was etched with potassium hydroxide, and $MoS_2$ was transferred from the sapphire substrate to the adhesive sheet 1 to obtain a laminate 20c.

Thereafter, the laminate 20c was placed so that the surface of the $MoS_2$ side of the laminate 20c was in contact with a silicon substrate with an oxide film (silicon (crystal plane (100), manufactured by SUMCO Corporation), surface thermal oxidation-oxide film thickness: 300 nm), and the resultant one was allowed to bond with a roller (pressure of 2 kg/10 mm) to obtain a laminate 20d.

The laminate 20d was allowed to stand at normal temperature and normal pressure for 30 minutes, and then subjected to a UV treatment with a UV irradiator (UM-810, manufactured by Nitto Seiki Co., Ltd.) at an irradiation dose of 450 mJ/cm$^2$ from a base material side of the adhesive sheet 1, and the adhesive sheet 1 was debonded at a debonding angle of 180° and a debonding speed of 300 mm/min to transfer MoS$_2$ of the laminate 20c to a silicon substrate, thereby obtaining a laminate of the silicon substrate and MoS$_2$ in Example 1.

Example 21

(CVD Film Formation of WS$_2$)

A sapphire substrate (manufactured by Kyocera Corporation, c-plane), as a substrate for film formation of tungsten disulfide (WS$_2$), which is a kind of transition metal chalcogenide, was placed in a quartz tube (inner diameter: 26 mmφ) set in a ceramic tubular furnace manufactured by Asahi Rika Factory, Ltd. A crucible containing tungsten trioxide powder as a raw material was placed in an upstream region of a gas flow with respect to the substrate for film formation in the quartz tube, and a crucible containing sulfur powder was further placed in the upstream region.

A sapphire substrate having a size of 10 mm square was used, and 10 mg to 50 mg of tungsten trioxide and 50 mg to 200 mg of sulfur were used. As for a distance between the sapphire substrate and each crucible, a crucible for the tungsten trioxide requiring the highest reaction temperature was placed at a center of a tubular furnace, the sapphire substrate was placed at a position 5 cm to 15 cm away therefrom, and the crucible for the sulfur was placed at a position 15 cm to 25 cm away from the tungsten trioxide crucible.

Thereafter, the sapphire substrate and each crucible were heated to a predetermined temperature (substrate: 900° C. to 1000° C., tungsten trioxide: 1050° C. to 1100° C., sulfur: 100° C. to 200° C.) under atmospheric pressure while argon was allowed to flow, and a chemical vapor phase reaction for 30 minutes was performed. After the reaction, the sapphire substrate on which isolated WS$_2$ crystal grains were formed was cooled and the temperature of the substrate reached at room temperature (23° C.), and then the sapphire substrate was taken out from the quartz tube.

By this reaction, WS$_2$ having a crystal grain size of about 5 μm to 50 μm was formed on a surface of the sapphire substrate (laminate 21a (grains)).

(Method of Debonding and Transferring WS$_2$ Grown on Sapphire Substrate from Sapphire Substrate)

The adhesive sheet 1 was attached to a surface of a WS$_2$ side of the laminate 21a with a roller (pressure of 2 kg/10 mm), the attached one was subjected to an autoclave treatment at 5 atm at 50° C. for 30 minutes and allowed to stand at normal temperature and normal pressure for 30 minutes.

Thereafter, a laminate 21b (adhesive sheet/WS$_2$/sapphire substrate) was immersed in an aqueous potassium hydroxide solution having a concentration of 1 mol/L. Thus, only a sapphire outermost surface was etched with potassium hydroxide, and WS$_2$ was transferred from the sapphire substrate to the adhesive sheet 1 to obtain a laminate 21c.

Thereafter, the laminate 21c was placed so that the surface of the WS$_2$ side of the laminate c was in contact with a silicon substrate with an oxide film (silicon (crystal plane (100), manufactured by SUMCO Corporation), surface thermal oxidation-oxide film thickness: 300 nm), and the resultant one was allowed to bond with a roller (pressure of 2 kg/10 mm) to obtain a laminate 21d. The laminate 21d was allowed to stand at normal temperature and normal pressure for 30 minutes, and then subjected to a UV treatment with a UV irradiator (UM-810, manufactured by Nitto Seiki Co., Ltd.) at an irradiation dose of 450 mJ/cm$^2$ from a base material side of the adhesive sheet 1, and the adhesive sheet 1 was debonded at a debonding angle of 180° and a debonding speed of 300 mm/min to transfer WS$_2$ of the laminate 21c to a silicon substrate, thereby obtaining a laminate of the silicon substrate and WS$_2$ in Example 21.

Example 22

(CVD Film Formation of h-BN)

An iron-nickel alloy foil substrate (manufactured by Nilaco Co., Ltd.) was placed as a substrate for film formation of h-BN in an alumina tube (inner diameter: 39 mmφ) set in a ceramic tubular furnace manufactured by Asahi Rika Factory, Ltd. An iron-nickel alloy foil substrate having a size of 10 mm square was used.

Thereafter, a temperature was increased to a predetermined temperature (1000° C. to 1200° C.) under reduced pressure (10 Pa to 1000 Pa) while argon and hydrogen were flowed. After reaching the predetermined temperature, the iron-nickel alloy substrate was held under the same conditions for 0 to 3 hours to reduce and smooth a surface of the iron-nickel alloy substrate. Thereafter, borazine was added so as to have a partial pressure of 1 Pa or less, and a chemical vapor phase reaction was performed for 30 minutes.

After the reaction, the temperature reached at a room temperature (23° C.), and then the iron-nickel alloy foil substrate on which multilayer h-BN was formed was taken out from the alumina tube. By this reaction, a multilayer h-BN having a thickness of about 1 nm to 50 nm was formed on an entire surface of the iron-nickel alloy substrate (laminate 22a (entire surface)).

(Method of Debonding h-BN Grown on Catalyst Substrate from Catalyst)

The adhesive sheet 1 was attached to a surface of an h-BN side of the laminate 22a with a roller (pressure of 2 kg/10 mm), and the attached one was subjected to an autoclave treatment at 5 atm at 50° C. for 30 minutes and allowed to stand at normal temperature and normal pressure for 30 minutes.

Thereafter, the laminate 22b (adhesive sheet/h-BN/iron-nickel alloy foil) was immersed in hydrochloric acid having a concentration of 1 mol/L. As a result, the surface of the iron-nickel alloy substrate was etched with hydrochloric acid, hydrogen gas was generated between the iron-nickel alloy substrate and h-BN, and h-BN was transferred from the iron-nickel alloy substrate to the adhesive sheet 1 to obtain a laminate 22c.

Thereafter, the laminate 22c was placed so that the surface of the h-BN side of the laminate 22c was in contact with a silicon substrate with an oxide film (silicon (crystal plane (100), manufactured by SUMCO Corporation), surface thermal oxide-oxide film thickness: 90 nm), and the resultant one was allowed to bond with a roller (pressure of 2 kg/10 mm) to obtain a laminate 22d.

The laminate 22d was allowed to stand at normal temperature and normal pressure for 30 minutes, and then subjected to a UV treatment with a UV irradiator (UM-810, manufactured by Nitto Seiki Co., Ltd.) at an irradiation dose of 450 mJ/cm$^2$ from a base material side of the adhesive sheet 1, and the adhesive sheet 1 was debonded at a debonding angle of 180° and a debonding speed of 300 mm/min to transfer h-BN of the laminate 22c to a silicon substrate, thereby obtaining a laminate of the silicon substrate and h-BN in Example 22.

Comparative Example 1

A laminate of a silicon substrate and graphene in Comparative Example 1 was obtained by performing the same operation as in Example 1 except that the adhesive sheet 1 in Example 1 was changed to the adhesive sheet 4 and a UV treatment was changed to a heat treatment.

Comparative Example 2

A laminate of a silicon substrate and graphene in Comparative Example 2 was obtained by performing the same operation as in Example 1 except that the adhesive sheet 1 in Example 1 was changed to the adhesive sheet 5 and a UV treatment was not performed.

Laminates obtained in Examples 1 to 3 and 14 to 22 and Comparative Examples 1 and 2 were shown in Tables 1 and 2.

TABLE 1

|  |  | Example 1 | Example 2 | Example 3 | Comparative Example 1 | Comparative Example 2 |
|---|---|---|---|---|---|---|
| Adhesive sheet |  | 1 | 2 | 3 | 4 | 5 |
| Composition of base material |  | EVA | Polyolefin | PET | PET | Polyolefin |
| Thickness of adhesive (μm) |  | 17 | 20 | 30 | 50 | 20 |
| Thickness of base material (μm) |  | 115 | 150 | 50 | 100 | 150 |
| Trigger for changing adhesive force |  | Ultraviolet rays | Ultraviolet rays | Ultraviolet rays | Heat | No |
| Adhesive surface roughness after triggered (μm) |  | 0.32 | 2.31 | 0.18 | 11.81 | 1.87 |
| 180° adhesive force to silicon wafer (N/20 mm) | Initial | 2.2 | 11.6 | 14.7 | 4.1 | 12.2 |
|  | After triggered | 0.21 | 0.15 | 0.11 | 0.18 | — |
| Two-dimensional material |  | Graphene | Graphene | Graphene | Graphene | Graphene |
| Reaction time (minutes) for production of two-dimensional material | Entire surface | 90 | 90 | 90 | 90 | 90 |
|  | Grain | 30 | 30 | 30 | 30 | 30 |
| Transfer rate of two-dimensional material (%) | Entire surface | 82 | 73 | 52 | 25 | 0 |
|  | Grain | 99 | 90 | 65 | 28 | 0 |

TABLE 2

|  |  | Example 14 | Example 15 | Example 16 | Example 17 | Example 18 |
|---|---|---|---|---|---|---|
| Adhesive sheet |  | 6 | 7 | 8 | 9 | 10 |
| Composition of base material |  | EVA | EVA | EVA | Nylon | Polyolefin |
| Thickness of adhesive (μm) |  | 17 | 17 | 17 | 17 | 17 |
| Thickness of base material (μm) |  | 115 | 115 | 115 | 25 | 50 |
| Trigger for changing adhesive force |  | Ultraviolet rays | Ultraviolet rays | Ultraviolet rays | Ultraviolet rays | Ultraviolet rays |
| Adhesive surface roughness after triggered (μm) |  | 0.45 | 0.33 | 0.32 | 0.32 | 0.31 |
| 180° adhesive force to silicon wafer (N/20 mm) | Initial | 3.2 | 1.4 | 3.4 | 2.3 | 1.7 |
|  | After triggered | 0.45 | 0.11 | 0.41 | 0.32 | 0.73 |
| Two-dimensional material |  | Graphene | Graphene | Graphene | Graphene | Graphene |
| Reaction time (minutes) for production of two-dimensional material | Entire surface | 90 | 90 | 90 | 90 | 90 |
|  | Grain | 30 | 30 | 30 | 30 | 30 |
| Two-dimensional material transfer rate (%) | Entire surface | 75 | 85 | 72 | 81 | 72 |
|  | Grain | 95 | 99 | 92 | 98 | 88 |

|  |  | Example 19 | Example 20 | Example 21 | Example 22 |
|---|---|---|---|---|---|
| Adhesive sheet |  | 11 | 1 | 1 | 1 |
| Composition of base material |  | Polyolefin | EVA | EVA | EVA |
| Thickness of adhesive (μm) |  | 17 | 17 | 17 | 17 |
| Thickness of base material (μm) |  | 50 | 115 | 115 | 115 |
| Trigger for changing adhesive force |  | Ultraviolet rays | Ultraviolet rays | Ultraviolet rays | Ultraviolet rays |
| Adhesive surface roughness after triggered (μm) |  | 0.35 | 0.32 | 0.32 | 0.32 |
| 180° adhesive force to silicon wafer (N/20 mm) | Initial | 3.3 | 2.2 | 2.2 | 2.2 |
|  | After triggered | 0.95 | 0.21 | 0.21 | 0.21 |
| Two-dimensional material |  | Graphene | $MoS_2$ | $WS_2$ | h-BN |
| Reaction time (minutes) for production of two-dimensional material | Entire surface | 90 | — | — | 30 |
|  | Grain | 30 | 30 | 30 | — |

TABLE 2-continued

| | | | | | |
|---|---|---|---|---|---|
| Two-dimensional material transfer rate (%) | Entire surface | 35 | — | — | 77 |
| | Grain | 45 | 98 | 99 | — |

<Surface Roughness>

As for the adhesive sheets 1 to 3 and 6 to 11 produced as described above, each of the adhesive sheets 1 to 3 and 6 to 11 was cut so as to have a width of 20 mm and a length of 10 cm, the cut products were subjected to a UV treatment, and a debonding liner was debonded and removed.

As for the adhesive sheet 4 produced as described above, the adhesive sheet 4 was cut so as to have a width of 20 mm and a length of 10 cm, the cut product was subjected to a heat treatment, and a debonding liner was debonded and removed.

As for the adhesive sheet 5 produced as described above, the adhesive sheet 5 was cut so as to have a width of 20 mm and a length of 10 cm, and a debonding liner was debonded and removed.

The UV treatment was performed with a UV irradiator (UM-810, manufactured by Nitto Seiki Co., Ltd.) at an irradiation dose of 450 mJ/cm² from a base material side of each of the adhesive sheets 1 to 3.

In the heat treatment, the adhesive sheet 4 was allowed to stand on a hot plate heated to 150° C. in such a manner that the base material side of the adhesive sheet 4 was brought into contact with the hot plate, and taken out and air-cooled after the adhesive layer was allowed to stand for 1 minute.

A surface roughness of the adhesive surface of the adhesive layer was measured by a white light confocal microscope (Lasertec OPTELICS HYBRID, manufactured by Lasertec Corporation) using a 20×objective lens with software "LMeye 7". After the adhesive layer is attached to a silicon wafer, the outermost surface of the debonded adhesive surface of the adhesive layer in which the adhesive force had been reduced by heat or ultraviolet rays, and was focused on, scanned and measured in a range of up and down 50 μm. The measured 750 μm square image was subjected to the same software "LMeye 7" to calculate Ra at five arbitrary lines in the surface roughness line profile, and the average value thereof was defined as an adhesive surface roughness (μm) after triggered.

<Measurement of Adhesive Force>

An adhesive force (initial) of each of the adhesive sheets 1 to 3 and 6 to 11 produced as described above before a UV treatment was measured.

The adhesive force was measured by cutting each of the adhesive sheets 1 to 3 and 6 to 11 so as to have a width of 20 mm and a length of 10 cm, and then a debonding liner was debonded and removed.

Subsequently, the adhesive sheet in each example was allowed to press-bond to a silicon wafer (4-inch silicon mirror wafer) by reciprocating once with a 2 kg roller.

Using a tensile tester (AUTOGRAPH AGS-X, manufactured by Shimadzu Corporation), a force at the time of peeling at a debonding angle of 180° and a debonding speed of 300 mm/min was measured as the adhesive force (debonding force to silicon wafer at 180° (initial)) (N/20 mm).

The adhesive force (debonding force to silicon wafer at 180° (after triggered)) (N/20 mm) after the UV treatment was measured by the same operation as described above except that the adhesive sheet was allowed to press-bond to the silicon wafer (4-inch silicon mirror wafer) and then the resultant one was subjected to the UV treatment.

The UV treatment was performed with a UV irradiator (UM-810, manufactured by Nitto Seiki Co., Ltd.) at an irradiation dose of 450 mJ/cm² from a base material side of each of the adhesive sheets 1 to 3 and 6 to 11.

The adhesive force (initial) of the adhesive sheet 4 produced as described above before the heat treatment was measured.

The adhesive force was measured by cutting the adhesive sheet 4 so as to have a width of 20 mm and a length of 10 cm, and then the debonding liner was debonded and removed.

Subsequently, the adhesive sheet in each example was allowed to press-bond to a silicon wafer (4-inch silicon mirror wafer) by reciprocating once with a 2 kg roller.

Using a tensile tester (AUTOGRAPH AGS-X, manufactured by Shimadzu Corporation), a force at the time of peeling at a debonding angle of 180° and a debonding speed of 300 mm/min was measured as the adhesive force (initial) (N/20 mm).

The adhesive force (after triggered) (N/20 mm) after the heat treatment was measured by the same operation as described above except that the heat treatment was performed after the adhesive sheet was allowed to press-bond to the silicon wafer (4-inch silicon mirror wafer).

In the heat treatment, the adhesive sheet 4 was allowed to stand on a hot plate heated to 150° C. in such a manner that the silicon wafer side of the adhesive sheet 4 was brought into contact with the hot plate, and taken out and air-cooled after the adhesive sheet 4 was allowed to stand for 1 minute.

The adhesive force (initial) of the adhesive sheet 5 produced as described above before the heat treatment was measured.

The adhesive force was measured by cutting the adhesive sheet 5 so as to have a width of 20 mm and a length of 10 cm, and then a debonding liner was debonded and removed.

Subsequently, the adhesive sheet in each example was allowed to press-bond to a silicon wafer (4-inch silicon mirror wafer) by reciprocating once with a 2 kg roller.

Using a tensile tester (AUTOGRAPH AGS-X, manufactured by Shimadzu Corporation), a force at the time of peeling at a debonding angle of 180° and a debonding speed of 300 mm/min was measured as the adhesive force (initial) (N/20 mm).

<Transfer Rate>

(Transfer Rate of Graphene (Entire Surface))

An image of graphene remaining on a surface of a transfer-target material of laminates (entire surface) of a silicon substrate and graphene obtained in Examples 1 to 3 and 14 to 19 and Comparative Examples 1 and 2 was obtained as a digital image by a metallurgical microscope (ME600 manufactured by Nikon Corporation) and a CCD camera (DS-Fi1 manufactured by Nikon Corporation). The digital image was an image observed with a magnification of 50 times the objective lens, the field of view was 160 μm×120 μm, and the digital images were obtained for three positions randomly selected. RGB separation and binarization analysis of each component image were performed using software "WinROOF" (manufactured by Mitani Corporation) using the obtained digital images, and an area ratio of graphene in the digital image was obtained in percentage. An average value of the area ratios of the graphene in the digital images of the three positions was defined as the transfer rate (entire surface).

(Transfer Rate (Grain) of Graphene)

After the laminate 1a (grains) in which graphene was formed on a Cu/sapphire substrate as described above was subjected to an oxidation treatment in water, before the adhesive sheet 1 was attached, an observation image of the graphene (grains) on the Cu/sapphire substrate was obtained as a digital image by a metallurgical microscope (ME600 manufactured by Nikon Corporation) and a CCD camera (DS-Fi1 manufactured by Nikon Corporation).

The digital image was an image observed with a magnification of 50 times the objective lens, and the field of view was 160 μm×120 μm. The digital images were obtained for three positions randomly selected.

Next, an observation image of the graphene transferred to the surface of the transfer-target material of the laminate (grain) of the silicon substrate and the graphene obtained in Example 1 was obtained as a digital image by the same metallurgical microscope and CCD camera at a position corresponding to the observation image of the graphene (grain) on the Cu/sapphire substrate obtained previously.

From each digital image, an area ratio of the graphene (grains) on the Cu/sapphire substrate obtained previously and the graphene (grains) on the silicon substrate at the corresponding position was obtained in percentage. An average value of the area ratios of the graphene in the digital images of the three positions was defined as the transfer rate (grain).

Figure 6:
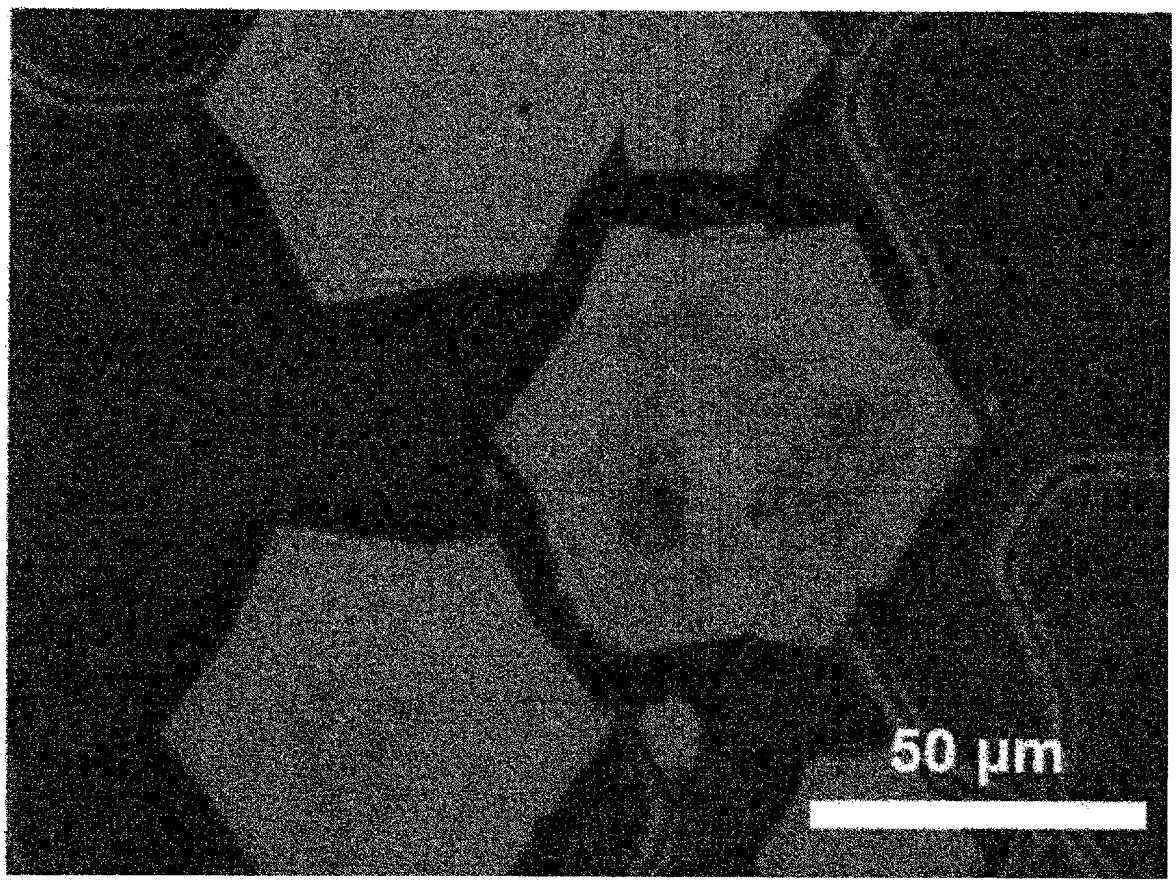
FIG. 6 is a diagram showing image data for illustrating an example of the present invention.

FIG. 6 shows an image of graphene crystal grains obtained by oxidizing a graphene/Cu/sapphire substrate in Example 1 in water, as a group of graphene crystal grains on the Cu substrate before the adhesion of an adhesive tape, as a digital image obtained by a metallurgical microscope (ME600 manufactured by Nikon Corporation) and a CCD camera (DS-Fi1 manufactured by Nikon Corporation).

Figure 7:
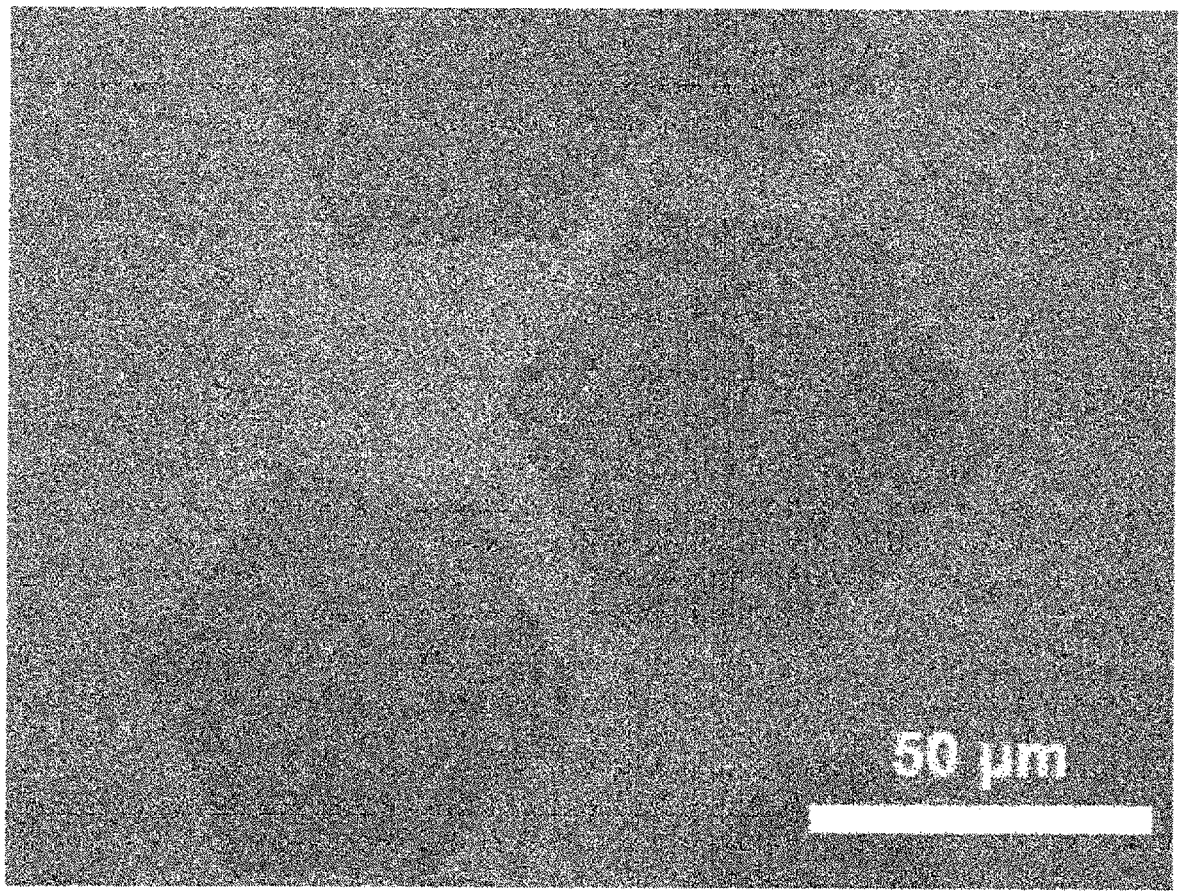
FIG. 7 is a diagram showing image data for illustrating an example of the present invention.

FIG. 7 shows an image of graphene on the surface of the laminate of the silicon substrate and graphene in Example 1 as a two-dimensional material crystal grain group on the transfer-target material transferred by the adhesive tape, as a digital image obtained by a metallurgical microscope (ME600 manufactured by Nikon Corporation) and a CCD camera (DS-Fi1 manufactured by Nikon Corporation).

The graphene crystal grain groups in FIGS. 6 and 7 were compared by microscopic observation to perform image analysis, and the transfer rate (grain) was calculated.

The images in Examples 2, 3, and 14 to 19 and Comparative Examples 1 to 3 were analyzed in the same manner, and the grain transfer rate was determined.

(Transfer Rate (Grain) of $MoS_2$ and $WS_2$)

Before the adhesive sheet 1 was attached to the laminate 20a, an observation image of $MoS_2$ on a sapphire substrate formed by CVD was obtained as a digital image by a metallurgical microscope (ME600 manufactured by Nikon Corporation) and a CCD camera (DS-Fi1 manufactured by Nikon Corporation). The digital image was an observation image with a magnification of 50 times the objective lens, and the field of view was 160 μm×120 μm. The digital images were obtained for three positions randomly selected.

Next, an image of $MoS_2$ remaining on the surface of the transfer-target material (silicon substrate) of the laminate of the silicon substrate and $MoS_2$ obtained in Example 20 was obtained as a digital image by the same metallurgical microscope and CCD camera at a position corresponding to the previously obtained observation image of $MoS_2$ on the sapphire substrate. An area ratio of $MoS_2$ of the silicon substrate at the position corresponding to $MoS_2$ on the sapphire substrate obtained previously was obtained in percentage. An average value of the area ratios of $MoS_2$ in the digital images of the three positions was defined as the transfer rate.

The transfer rate (grain) of $WS_2$ was determined by the same operation.

(Transfer Rate (Entire Surface) of h-BN)

The transfer rate (entire surface) of h-BN was obtained by the same operation as the transfer rate (entire surface) of graphene.

TABLE 3

|  | Example 4 | Example 5 | Example 6 | Example 7 |
|---|---|---|---|---|
| Debonding angle (degrees) | 20 | 60 | 120 | 180 |
| Observation results | Relatively good | Relatively good | Cracks occurred in vertical direction for the debonding | Cracks occurred in vertical direction for the debonding |

TABLE 4

|  | Example 8 | Example 9 | Example 10 | Example 11 | Example 12 | Example 13 |
|---|---|---|---|---|---|---|
| Debonding speed (mm/min) | 2500 | 1000 | 300 | 100 | 10 | 90000 |
| Observation results | Relatively good | Relatively good | Wholly broken | Wholly broken | Wholly broken | Good |

INDUSTRIAL APPLICABILITY

The present invention allows for providing a laminate and a method for producing a laminate of a two-dimensional material that have excellent productivity and can transfer a two-dimensional material at a high transfer rate.

Although the present invention has been described in detail with reference to specific embodiments, it will be apparent to those skilled in the art that various changes and modifications can be made without departing from the spirit and scope of the present invention.

REFERENCE SIGNS LIST

101, 102, 103, and 104: Laminate
10: Adhesive sheet
11: Base material
12: Adhesive layer
21: First substrate
30: Two-dimensional material
40: Second substrate
105: Laminate of two-dimensional material

The invention claimed is:

1. A method for producing a laminate of a two-dimensional material, comprising:
    allowing a two-dimensional material on a first substrate to bond and transfer to a surface of an adhesive layer side of an adhesive sheet comprising a base material and an adhesive layer whose adhesive force decreases due to ultraviolet rays or heat, to obtain a laminate of the adhesive sheet and the two-dimensional material;
    placing the laminate on a second substrate such that a surface of the laminate on a side of the two-dimensional material is in contact with the second substrate;
    applying the ultraviolet rays or heat to the laminate; and
    transferring the two-dimensional material onto the second substrate by debonding the adhesive sheet, wherein
    an adhesive force A at 25° C. of the adhesive layer before the ultraviolet rays or heat applies, to a silicon wafer is 1.0 N/20 mm to 20.0 N/20 mm when the adhesive layer is subjected to 180° peeling at a tensile speed of 300 mm/min,
    an adhesive force B at 25° C. of the adhesive layer after the ultraviolet rays or heat applied has been applied, to a silicon wafer is 0.01 N/20 mm to 1.00 N/20 mm when the adhesive layer is subjected to 180° peeling at a tensile speed of 300 mm/min, and
    a surface roughness of an adhesive surface of the adhesive layer after the ultraviolet rays or heat applied is 0.01 μm to 8.00 μm.

2. The method for producing a laminate of a two-dimensional material according to claim 1, wherein the two-dimensional material is a two-dimensional carbon material, molybdenum disulfide, tungsten disulfide, or hexagonal boron nitride.

3. The method for producing a laminate of a two-dimensional material according to claim 2, wherein the two-dimensional carbon material is graphene or a graphene derivative.

4. The method for producing a laminate of a two-dimensional material according to claim 2, wherein the adhesive layer contains an ultraviolet curable adhesive.

5. The method for producing a laminate of a two-dimensional material according to claim 2, wherein the base material has ultraviolet transparency.

6. The method for producing a laminate of a two-dimensional material according to claim 5, wherein a transfer rate of the two-dimensional material is 30% or more.

7. A method for producing a laminate of a two-dimensional material, comprising:
    allowing a two-dimensional material on a first substrate to bond and transfer to a surface of an adhesive layer side of an adhesive sheet comprising a base material and an adhesive layer whose adhesive force decreases due to ultraviolet rays or heat, to obtain a laminate of the adhesive sheet and the two-dimensional material;
    placing the laminate on a second substrate such that a surface of the laminate on a side of the two-dimensional material is in contact with the second substrate;
    applying the ultraviolet rays or heat to the laminate; and
    transferring the two-dimensional material onto the second substrate by debonding the adhesive sheet, wherein
    the two-dimensional material is a two-dimensional carbon material, molybdenum disulfide, tungsten disulfide, or hexagonal boron nitride,
    an adhesive force A at 25° C. of the adhesive layer before the ultraviolet rays or heat applies, to a silicon wafer is 1.0 N/20 mm to 20.0 N/20 mm when the adhesive layer is subjected to 180° peeling at a tensile speed of 300 mm/min, and
    a surface roughness of an adhesive surface of the adhesive layer after the ultraviolet rays or heat applied is 0.01 μm to 8.00 μm.

8. The method for producing a laminate of a two-dimensional material according to claim 7, wherein the two-dimensional carbon material is graphene or a graphene derivative.

9. The method for producing a laminate of a two-dimensional material according to claim 7, wherein the adhesive layer contains an ultraviolet curable adhesive.

10. The method for producing a laminate of a two-dimensional material according to claim 7, wherein the base material has ultraviolet transparency.

11. The method for producing a laminate of a two-dimensional material according to claim 10, wherein a transfer rate of the two-dimensional material is 30% or more.

12. A method for producing a laminate of a two-dimensional material, comprising:
    allowing a two-dimensional material on a first substrate to bond and transfer to a surface of an adhesive layer side of an adhesive sheet comprising a base material and an adhesive layer whose adhesive force decreases due to ultraviolet rays or heat, to obtain a laminate of the adhesive sheet and the two-dimensional material;
    placing the laminate on a second substrate such that a surface of the laminate on a side of the two-dimensional material is in contact with the second substrate;
    applying the ultraviolet rays or heat to the laminate; and
    transferring the two-dimensional material onto the second substrate by debonding the adhesive sheet, wherein
    the two-dimensional material is a two-dimensional carbon material, molybdenum disulfide, tungsten disulfide, or hexagonal boron nitride,
    an adhesive force A at 25° C. of the adhesive layer before the ultraviolet rays or heat applies, to a silicon wafer is 1.0 N/20 mm to 20.0 N/20 mm when the adhesive layer is subjected to 180° peeling at a tensile speed of 300 mm/min, and
    an adhesive force B at 25° C. of the adhesive layer after the ultraviolet rays or heat applied has been applied, to a silicon wafer is 0.01 N/20 mm to 1.00 N/20 mm when the adhesive layer is subjected to 180° peeling at a tensile speed of 300 mm/min.

13. The method for producing a laminate of a two-dimensional material according to claim 12, wherein the two-dimensional carbon material is graphene or a graphene derivative.

14. The method for producing a laminate of a two-dimensional material according to claim 12, wherein the adhesive layer contains an ultraviolet curable adhesive.

15. The method for producing a laminate of a two-dimensional material according to claim 12, wherein the base material has ultraviolet transparency.

16. The method for producing a laminate of a two-dimensional material according to claim 15, wherein a transfer rate of the two-dimensional material is 30% or more.

* * * * *